(12) United States Patent
El-Sayed

(10) Patent No.: US 9,539,522 B1
(45) Date of Patent: *Jan. 10, 2017

(54) COMBINATION MULTI-EFFECT DISTILLATION AND MULTI-STAGE FLASH EVAPORATION SYSTEM

(71) Applicant: KUWAIT INSTITUTE FOR SCIENTIFIC RESEARCH, Safat (KW)

(72) Inventor: Essam El-Din Farag El-Sayed, Ontario (CA)

(73) Assignee: Kuwait Institute for Scientific Research, Safat (KW)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,563

(22) Filed: Dec. 9, 2015

Related U.S. Application Data

(63) Continuation of application No. 14/955,892, filed on Dec. 1, 2015.

(51) Int. Cl.
| | | |
|---|---|---|
| *C02F 1/04* | (2006.01) | |
| *B01D 1/26* | (2006.01) | |
| *B01D 3/14* | (2006.01) | |
| *B01D 3/06* | (2006.01) | |
| *B01D 1/28* | (2006.01) | |
| *C02F 1/06* | (2006.01) | |
| *C02F 103/08* | (2006.01) | |

(52) U.S. Cl.
CPC .............. *B01D 1/26* (2013.01); *B01D 1/2884* (2013.01); *B01D 3/065* (2013.01); *B01D 3/145* (2013.01); *C02F 1/041* (2013.01); *C02F 1/06* (2013.01); *C02F 2103/08* (2013.01)

(58) Field of Classification Search
CPC .............. B01D 1/26; B01D 3/065; C02F 1/04; C02F 1/041
See application file for complete search history.

(56) References Cited

U.S. PATENT DOCUMENTS 3,119,752 A * 1/1964 Checkovich ............ C02F 1/042
159/17.3
3,152,053 A * 10/1964 Lynam ...................... C02F 1/04
159/2.3

(Continued)

FOREIGN PATENT DOCUMENTS

CA         2190299         5/1998

*Primary Examiner* — In Suk Bullock
*Assistant Examiner* — Jonathan Miller
(74) *Attorney, Agent, or Firm* — Richard C. Litman

(57) ABSTRACT

The combination multi-effect distillation and multi-stage flash evaporation system integrates a multi-stage flash (MSF) evaporation system with a multi-effect distillation (MED) system such that the flashing temperature range of the MSF process is shifted upward on the temperature scale, while the MED distillation process operates in the lower temperature range. The multi-stage flash evaporation system includes a plurality of flash evaporation/condensation stages, such that the multi-stage flash evaporation system receives a volume of seawater or brine from an external source and produces distilled water. The multi-effect distillation system includes a plurality of condensation/evaporation effects, such that the multi-effect distillation system receives concentrated brine from the multi-stage flash desalination system and produces distilled water.

19 Claims, 8 Drawing Sheets

(56) References Cited

U.S. PATENT DOCUMENTS

| | | | | |
|---|---|---|---|---|
| 3,257,290 A * | 6/1966 | Starmer | B01D 1/2812 | |
| | | | 159/24.1 | |
| 3,261,766 A * | 7/1966 | Sherwood | B01D 1/26 | |
| | | | 159/17.2 | |
| 3,345,272 A * | 10/1967 | Collins | B01D 3/346 | |
| | | | 159/13.4 | |
| 3,351,120 A * | 11/1967 | Goeldner | B01D 1/26 | |
| | | | 159/13.3 | |
| 3,489,652 A * | 1/1970 | Williamson | C02F 1/16 | |
| | | | 159/2.3 | |
| 3,844,899 A * | 10/1974 | Sager, Jr. | C02F 1/06 | |
| | | | 159/18 | |
| 3,871,968 A * | 3/1975 | Wood | C02F 1/04 | |
| | | | 159/DIG. 22 | |
| 3,926,739 A * | 12/1975 | Izumi | B01D 1/26 | |
| | | | 159/17.3 | |
| 3,941,663 A * | 3/1976 | Steinbruchel | B01D 1/26 | |
| | | | 159/13.3 | |
| 3,966,562 A * | 6/1976 | Mukushi | B01D 3/065 | |
| | | | 159/17.2 | |
| 3,974,039 A * | 8/1976 | Frohner | C02F 1/042 | |
| | | | 159/DIG. 13 | |
| 4,239,588 A * | 12/1980 | Engelhardt | B01D 1/26 | |
| | | | 159/17.1 | |
| 4,330,373 A * | 5/1982 | Liu | C02F 1/14 | |
| | | | 159/17.1 | |
| 4,348,261 A * | 9/1982 | Saari | B01D 3/065 | |
| | | | 159/47.1 | |
| 4,376,679 A * | 3/1983 | Liu | B01D 3/065 | |
| | | | 159/47.1 | |
| 4,497,689 A * | 2/1985 | Szucs | B01D 1/22 | |
| | | | 159/17.1 | |
| 4,636,283 A * | 1/1987 | Nasser | B01D 1/065 | |
| | | | 159/13.1 | |
| 6,508,936 B1 | 1/2003 | Hassan | | |
| 7,251,944 B2 * | 8/2007 | Holtzapple | B01D 1/0058 | |
| | | | 62/333 | |
| 7,431,805 B2 * | 10/2008 | Beckman | B01D 1/22 | |
| | | | 202/155 | |
| 8,328,995 B2 * | 12/2012 | Eddington | B01D 1/26 | |
| | | | 159/17.2 | |
| 9,028,653 B2 * | 5/2015 | Kwak | C02F 1/14 | |
| | | | 202/174 | |
| 2006/0157410 A1 | 7/2006 | Hassan | | |
| 2011/0147195 A1 | 6/2011 | Shapiro et al. | | |
| 2011/0162952 A1 | 7/2011 | Conchieri et al. | | |
| 2012/0012529 A1 | 1/2012 | De Souza | | |
| 2013/0292331 A1 * | 11/2013 | Lipscomb | B01D 61/58 | |
| | | | 210/640 | |
| 2014/0034479 A1 | 2/2014 | Peng et al. | | |

* cited by examiner

COMBINATION MULTI-EFFECT DISTILLATION AND MULTI-STAGE FLASH EVAPORATION SYSTEM

CROSS REFERENCE TO RELATED APPLICATION

This application is a continuation of application Ser. No. 14/955,892, filed Dec. 1, 2015.

BACKGROUND OF THE INVENTION

1. Field of the Invention

The present invention relates to desalination, and particularly to a system for producing desalinated water from saltwater, such as seawater using both multi-effect distillation and multi-stage flash evaporation.

2. Description of the Related Art

A falling film evaporator is an industrial device to concentrate solutions, especially with heat sensitive components. The evaporator is a special type of heat exchanger. In general, the evaporation takes place on the outside surfaces of horizontal or vertical tubes, although it should be noted that there are also applications where the process fluid evaporates inside vertical tubes. In all cases, the process fluid to be evaporated flows downwards by gravity as a continuous film. The fluid creates a film along the tube walls, progressing downwards, hence the name "falling film".

In a falling film evaporator, the fluid distributor must be designed carefully in order to maintain an even liquid distribution for all tubes along which the solution falls. In the majority of applications, the heating medium is placed inside the tubes, thus high heat transfer coefficients can be achieved. In order to satisfy this requirement, condensing steam is commonly used as a heating medium.

For internally evaporating fluids, separation between the liquid phase (i.e., the solution) and the gaseous phase takes place inside the tubes. In order to maintain conservation of mass as this process proceeds, the downward vapor velocity increases, increasing the shear force acting on the liquid film and therefore also the velocity of the solution. The result can be a high film velocity of a progressively thinner film, resulting in increasingly turbulent flow. The combination of these effects allows very high heat transfer coefficients.

The heat transfer coefficient on the evaporating side of the tube is mostly determined by the hydrodynamic flow conditions of the film. For low mass flows or high viscosities, the film flow can be laminar, in which case heat transfer is controlled purely by conduction through the film. Therefore, in this condition, the heat transfer coefficient decreases with increased mass flow. With increased mass flow, the film becomes wavy laminar and then turbulent. Under turbulent conditions, the heat transfer coefficient increases with increased flow. Evaporation takes place at very low mean temperature differences between heating medium (i.e., process stream) and film liquid, typically between 3 K and 6 K, thus such devices are ideal for heat recovery in multi effect processes.

A further advantage of the falling film evaporator is the very short residence time of the liquid and the absence of superheating of the same. The residence time inside the tubes is typically measured in seconds, making it ideal for heat-sensitive products such as milk, fruit juice, pharmaceuticals, and many other mass-produced liquid products. Falling film evaporators are also characterized by very low pressure drops, thus they are often used in deep vacuum applications as well.

However, due to the intimate contact of the film liquid with the heating surface, such evaporators are susceptible to fouling from precipitating solids; liquid velocity, typically low at the top rows of a bank of horizontal tubes, is usually not sufficient to perform an effective self-cleaning of the tubes. Falling film evaporators are therefore typically used only with clean, non-precipitating liquids.

Falling film evaporation is the primary principle used in multi-effect distillation (MED) systems (sometimes also referred to as "multiple-effect distillation systems"). Multi-effect distillation is a distillation process often used for sea water desalination. It consists of multiple stages or "effects". In each effect, the seawater feed falls as a film over the outside surfaces of the tubes and is heated by steam inside the tubes. Some of the falling water film evaporates, and this vapor flows into the tubes of the next effect, heating and evaporating more water. Each effect essentially reuses the energy from the previous effect. Although the tubes can be submerged in the feed water, it is far more common that the seawater feed is sprayed on the top of a bank of horizontal tubes, and then drips from tube to tube until it is collected at the bottom of the effect.

FIG. 2 illustrates a typical prior art multi-effect distillation evaporator 100. In the first effect 102, seawater is fed, via an inlet 108, to one or more sprayers or nozzles 110 positioned within the first effect 102. Heated steam, produced by an external boiler or the like, is fed through a tube 112. As the sprayed seawater lands on the external surface of the tube 112, and forms a thin liquid film thereon, heat transferred from the heating steam causes the seawater to evaporate, forming water vapor V. The heat transfer cools the steam, producing condensate in the tube 112, which is then returned back to the boiler for subsequent re-heating. The seawater which does not evaporate (indicated as S in FIG. 2), drips from one portion of the tube 112 to another (or from tube to tube, in the case where multiple such tubes are used), until it is collected at the bottom 114 of the first effect. A pump 116 then delivers this collected seawater into the second effect 104, where it is sprayed by sprayers or nozzles 120, similar to the spraying in the first effect 102.

The water vapor V from the first effect is transferred by a second tube 118 into the second effect and acts in a similar manner to the steam passing through tube 112 in the first effect, except that the condensate in second tube 118, rather than being returned to the boiler, is drawn out through a product conduit 124, where distilled water is collected. The seawater S which does not evaporate into water vapor V in the second effect 104, once again, falls from tube portion to tube portion (or tube to tube) to be collected on the bottom 122 of the second effect 104. A pump 126 then delivers this collected seawater into the third effect 106, where it is sprayed by sprayers or nozzles 128, similar to the spraying in the first and second effects 102, 104.

The water vapor V from the second effect 104 is transferred by a third tube 130 into the third effect 106 and acts in a similar manner to the steam passing through tube 112 in the first effect 102 and the heated vapor passing through the second tube 118 in second effect 104. In the third effect 106, the condensate in third tube 130 is drawn out through the product conduit 124, where it mixes with the desalinated water from the second effect 104 to be collected. The seawater S which does not evaporate into water vapor V in the third effect 106, once again, falls from tube portion to tube portion (or tube to tube) to be collected on the bottom 132 of the third effect 106, where it is then pumped, by pump 134, to the next effect. Although only three effects 102, 104, 106 are shown in FIG. 2, it should be understood that this is shown for exemplary and illustrative purposes only. An example of a conventional multi-effect distillation system is shown in U.S. Pat. No. 3,481,835, which is hereby incorporated by reference in its entirety.

Conventional multi-effect distillation systems, such as the above, which generally rely on falling film evaporation, suffer from a number of drawbacks, each of which typically limits the design capacity of the units and the maximum permissible operating temperatures. On a broad level, many MED designs involve complex and often circuitous paths for heated seawater and vapor to minimize usage of pumps, maintain wettability of the tubes to avoid scaling, and to maximize energy recovery from the flashing brine and distillate. The farther the pumps, vessels, water routes and vapor routes are from minimal, optimized paths, the more the design suffers from excessive losses.

In addition to multi-effect distillation systems, multi-stage flash (MSF) evaporation is also relatively commonly used to produce desalinated water from saltwater sources, such as seawater. FIG. 3 shows a conventional prior art MSF system or plant 200, where feed seawater or brine enters the system under pressure, being drawn into the plant 200 via a pump 228 or the like. The seawater or brine is transported, under pressure, through conduits or pipes 232 to a brine heater 214, which then delivers heated brine to flash chambers 216. A steam generator 212, which is a separate simple steam power plant, external to the MSF system, supplies the brine heater 214 with the heating steam needed to heat up the brine. The steam generator 212 is a simple steam power plant (preferably a Rankine cycle power plant), and consists of a pump 240, a boiler 242, and a steam turbine 244, in addition to the condenser 214, which also acts as the brine heater. It should be understood that the steam turbine 244 shown in FIG. 3 is not a component of a typical MSF process, but is merely shown in this example as part of an exemplary plant utilizing MSF. The steam passing to the brine heater 214 may be extracted from a turbine, such as steam turbine 244, or may be fed directly from boiler 242. It should be understood that the simplified illustration of FIG. 3 is provided merely to describe a conventional MSF process and system. Typically, a de-superheater would also be used to condition the steam, whether extracted from a turbine or passing directly from a boiler, prior to entering the brine heater 214, thus ensuring that the steam is saturated and not superheated. Conventional MSF systems are well-known. U.S. Pat. Nos. 3,966,562 and 8,277,614, both of which are hereby incorporated by reference in their entirety, show conventional MSF systems.

As shown, the seawater or brine may also be first drawn through a cooler 230 in order to reduce the temperature of the feed, thus also the temperature of the last stage. The brine is then passed through the feed heater conduits 232. The feed heaters are condenser type heat exchangers where feed is heated by the heat released from condensing the vapor flashed off in each stage. Feed brine reaches the first stage at an elevated temperature, however it is not high enough to start flashing, and therefore, additional heat must be supplied to the brine. The brine heater 214 receives steam from the external steam generator 212, and elevates the brine temperature to the level suitable to start flashing. The brine is then injected into the flash chambers 216. It should be understood that the number of flash chambers 216 shown in FIG. 3 is shown for exemplary purposes only, and is a simplification of the number of flash stages. Typical MSF plants have between fifteen and forty stages or flash chambers. The brine delivered by the heater 214 typically has a temperature of between approximately 90° C. and 120° C., depending upon the chemical treatment or scale prevention technique used, the quality of heating steam, and the ejection system maintaining pressure in each stage.

The operating pressure in the flash chambers 216 is lower than that in the heater, thus causing the heated brine to rapidly boil or "flash" into vapor. Typically, only a small percentage of this water is converted into vapor. Consequently, the remaining water will be sent through a series of additional stages or flash chambers 216, as shown, each possessing a lower operating pressure than the previous chamber. The brine is delivered through each successive flash chamber 216 or stage through any conventional method. As vapor is generated, it is condensed in the same stage or flash chamber on the pipes 232, which run through each chamber. The condensed water is then collected by collection trays 218 and is removed by a pump 220 to produce a stream of desalinated water 222. The pipes 232 and trays 218 form the condensers for each flash stage. The remaining brine with a high saline concentration may be drawn out by a separate pump 224, and removed as waste at 226.

In the MSF process, heat transfer surfaces, which are on the brine side, are never subject to change of phase and are always kept wet and relatively free of scale precipitation by effective scale control techniques, typically involving chemical treatment of feed water and on-line mechanical cleaning. Flashing of the brine occurs at a safe distance from heat transfer tubes. This procedure makes the MSF process fairly protected from scale formation and precipitation up to the temperatures at which sulfate-based scales begin to form (i.e., above 121° C.).

In the MED process, on the other hand, evaporation takes place directly on the outside surfaces of the heat transfer tubes as the brine film reaches the liquid superheat temperatures needed for the change of phase to occur. Such an evaporation mechanism makes heat transfer surfaces highly vulnerable to scale formation and precipitation, especially since only chemical treatment can be used to retard scale formation while on-line mechanical cleaning is not possible. This situation imposes severe restrictions on the maximum practical operating temperatures in the MED process, which must be kept within a safe range (i.e., below 70° C.).

The conventional MSF process suffers from three primary sources of thermodynamic loss, namely boiling point elevation loss, pressure drop loss, and non-equilibrium loss. The boiling point elevation loss is due to the presence of salts at high concentrations in the brine, thus it is a loss that must be present in any process involving boiling or change of phase and its value depends on the state of the brine solution in terms of its temperature and concentration. Boiling point elevation loss increases with temperature as well as with concentration. In the MSF process, both driving forces of the boiling point elevation act conversely, since flashing brine temperature decreases while its concentration increases as the brine flows toward the lower temperature stages. Consequently, the resulting effect of this behavior minimizes the variations in the boiling point elevation across the MSF stages.

The pressure drop caused by the flow of vapor through the demisters and through the tube bundle results in vapor expansion, which is accompanied by a drop in its corresponding saturation temperature. This is known as pressure drop loss and it is far less in magnitude as compared with boiling point elevation or non-equilibrium losses, and it usually increases as the brine flows toward the lower temperature stages. The non-equilibrium loss, unlike the previous two losses, is an inherited characteristic of the MSF process. The amount of this loss is inversely proportional to the stage thermal level and it is directly proportional to the flashing brine depth. To illustrate such a characteristic, one can define the vapor equilibrium temperature in the brine pool at a given depth below the surface as $T^*_b = T^*_0 +$ $$\frac{dT^*}{dP} \cdot \gamma h_b,$$

where $T^*_0$ is the vapor equilibrium temperature at the stage pressure, $$\frac{dT^*}{dP}$$

represents the rate of change in vapor saturation temperature vs. pressure, and $\gamma h_b$ represents the hydrostatic pressure in the brine pool at a given depth $h_b$ below the surface.

FIG. 4 shows plots for $T^*_b$ at different values of $h_b$ over typical flashing ranges of the conventional MSF process. FIG. 4 shows that the effect of the brine depth on vapor equilibrium temperature in the brine pool is quite insignificant for high thermal level stages and it becomes rapidly significant for the lower thermal level stages. In other words, taking $(T_b)_{in}$ and $(T_b)_{out}$ as the brine bulk temperatures at the stage inlet and outlet less the boiling point elevation, then $(T_b)_{in} > T^*_b$ is a condition necessary for evaporation to occur at any point on the brine surface and below to a maximum depth of $h_b$. For high thermal level stages, this condition is usually furnished even for the maximum submergence in the brine pool. However, for evaporation to remain effective as the brine travels through the stage towards its outlet, the condition $(T_b)_{out} > T^*_b$ must be sustained for a significant depth in the brine pool. As the brine flows toward lower thermal level stages, the condition $(T_b)_{in} > T^*_b > (T_b)_{out}$ becomes prevalent even for minimum brine depth, which indicates that evaporation may take place only near the surface at the stage inlet and it lessens until it diminishes as the brine approaches the stage outlet, thus making a significant part of the stage nonproductive.

FIG. 5 is a plot of the three losses and the resulting total thermodynamic losses across the stages of a typical prior art MSF unit. FIG. 5 shows the changes in the relative magnitudes of these losses as fractions of the total average temperature difference between flashing and recycling brine along the stages of the MSF unit. Contrary to MSF, non-equilibrium thermodynamic losses are non-existent in the MED process. This is because evaporation occurs in the superheated liquid film rather than by flashing of the liquid pool. On the other hand, both boiling point elevation and pressure drop losses exist to an extent similar to that of the MSF process. However, these losses have far less significance as far as the thermal performance of the MED process is concerned, mainly because the evaporation temperature range is already limited to a narrow low temperature stretch, and also because the overall heat transfer coefficient at these low thermal levels is almost double that of the MSF process.

The combined effect of these losses is illustrated by the per-stage and the accumulated mass flow rates of product distillate shown in FIG. 6 for a typical prior art MSF unit. FIG. 6 clearly shows that stage productivity is directly dependent on stage thermal level, and that low stage productivity in the stages of the lower temperature range in the MSF process is an inherent characteristic.

Two basic quantities must be first established when an MSF or an MED plant is under consideration, namely the plant's production capacity and the available thermal energy in the form of low-grade steam required to drive any of these plants to produce the desired output. The guidelines for measuring MSF and MED plant effectiveness, or the process potential, are usually based on these two quantities and are known in combination as the gain output ratio (GOR) or the performance ratio (PR). The GOR is defined as the mass ratio between the product distillate (in kilograms per unit time) and the steam supplied to the process (also in kilograms per unit time). The PR is defined either as the amount of distillate mass (in kilograms per a predefined quantity of latent heat due to condensation of the heating steam, measured in kilojoules) or the amount of heat supplied (in kilojoules) to produce one kilogram of distillate. These ratios depend on several parameters, some of which are the top brine temperature (TBT), number of evaporation stages or effects, available flashing temperature range, mass ratio of the brine subject to evaporation and the product distillate, concentration of the brine, and effectiveness of evaporation stage or effect. There are, however, certain technical and economic limitations to the upper values of the GOR or PR that can be achieved for any process. However, one must be cautious when comparing these quantities (GOR or PR) for MSF with that of MED, since heating steam conditions, and, hence, the grades of energy supplied to each process, are usually quite different. It would be desirable to be able to integrate MSF with MED such that the flashing temperature range of the MSF process is shifted upward on the temperature scale for better performance of the MSF at relatively higher operating temperatures, while the MED subunit incorporated into the MSF system operates in the lower temperature range for better performance in this range.

Thus, a combination multi-effect distillation and multi-stage flash evaporation system solving the aforementioned problems is desired.

SUMMARY OF THE INVENTION

The combination multi-effect distillation and multi-stage flash evaporation system integrates a multi-stage flash (MSF) evaporation system with a multi-effect distillation (MED) system such that the flashing temperature range of the MSF process is shifted upward on the temperature scale (e.g., 70-120° C.), while the MED distillation process operates in the lower temperature range (e.g., below 70° C.). The multi-stage flash evaporation system includes a plurality of flash evaporation/condensation stages, such that the multi-stage flash evaporation system receives a stream of saltwater (e.g., seawater or brine) after being preheated by feed heaters of the multi-effect distillation system, and produces pure distilled water. The multi-effect distillation system includes a plurality of condensation/evaporation effects, such that the multi-effect distillation system receives the heated concentrated brine from the multi-stage flash evaporation system, for further distillation, and produces pure distilled water.

A brine heater is in fluid communication with the multi-stage flash evaporation stages, and a boiler is provided for delivering first heating steam into the brine heater for further heating of the brine stream after the brine stream has been preheated by the feed heaters of the multi-effect distillation system and evaporation stages of the multistage flash evaporation system. A first desuperheater may be provided for selectively cooling and conditioning the first stream of heating steam prior to infusion thereof into the brine heater.

Preferably, a first portion of condensed steam produced by the brine heater is recycled for use in the first desuperheater. A second portion of the condensed steam produced by the brine heater may be recycled for use in the boiler.

Saltwater is delivered from an external source and a pre-treatment system is further provided for filtering the saltwater prior to delivery thereof to said feed heaters of the multi-effect distillation system. The pre-treatment system may selectively include, for example, a low pressure microfiltration or ultrafiltration membrane system and a nanofiltration membrane system. Additionally, a second desuperheater may be provided for selectively cooling and conditioning second heating steam prior to infusion thereof into a first one of the plurality of distillation effects of the multi-effect distillation system. The second heating steam may be produced by the boiler. Additionally, a brine circulation pump is preferably provided between the multistage flash evaporation system and the multi-effect distillation system such that a first portion of unevaporated concentrated brine delivered by the pump is circulated back into the multistage flash evaporation system after mixing with pre-treated, pre-heated saltwater, thus forming a continuous brine stream for further heating, flashing and condensation in the multistage flash evaporation system. A second portion of the unevaporated concentrated brine is delivered to a first one of the plurality of distillation effects of the multi-effect distillation system for further distillation. Additionally, a pure water distillate stream is drawn from the last stage of the multistage flash evaporation system and is delivered to a first one of a plurality of receptacles in the multi-effect distillation system for further flashing and recovery of available latent heat of the pure water distillate.

In an alternative embodiment, a thermal vapor compressor is in fluid communication with a final one of the plurality of evaporation effects of the multi-effect distillation system, such that the thermal vapor compressor produces the second heating steam. The thermal vapor compressor is operated by relatively medium/low pressure motive steam provided by the boiler. In a further alternative embodiment, a mechanical vapor compressor is in fluid communication with at least one of the last flash evaporation stages for infusing heating steam into the brine heater, rather than using heating steam from the boiler.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
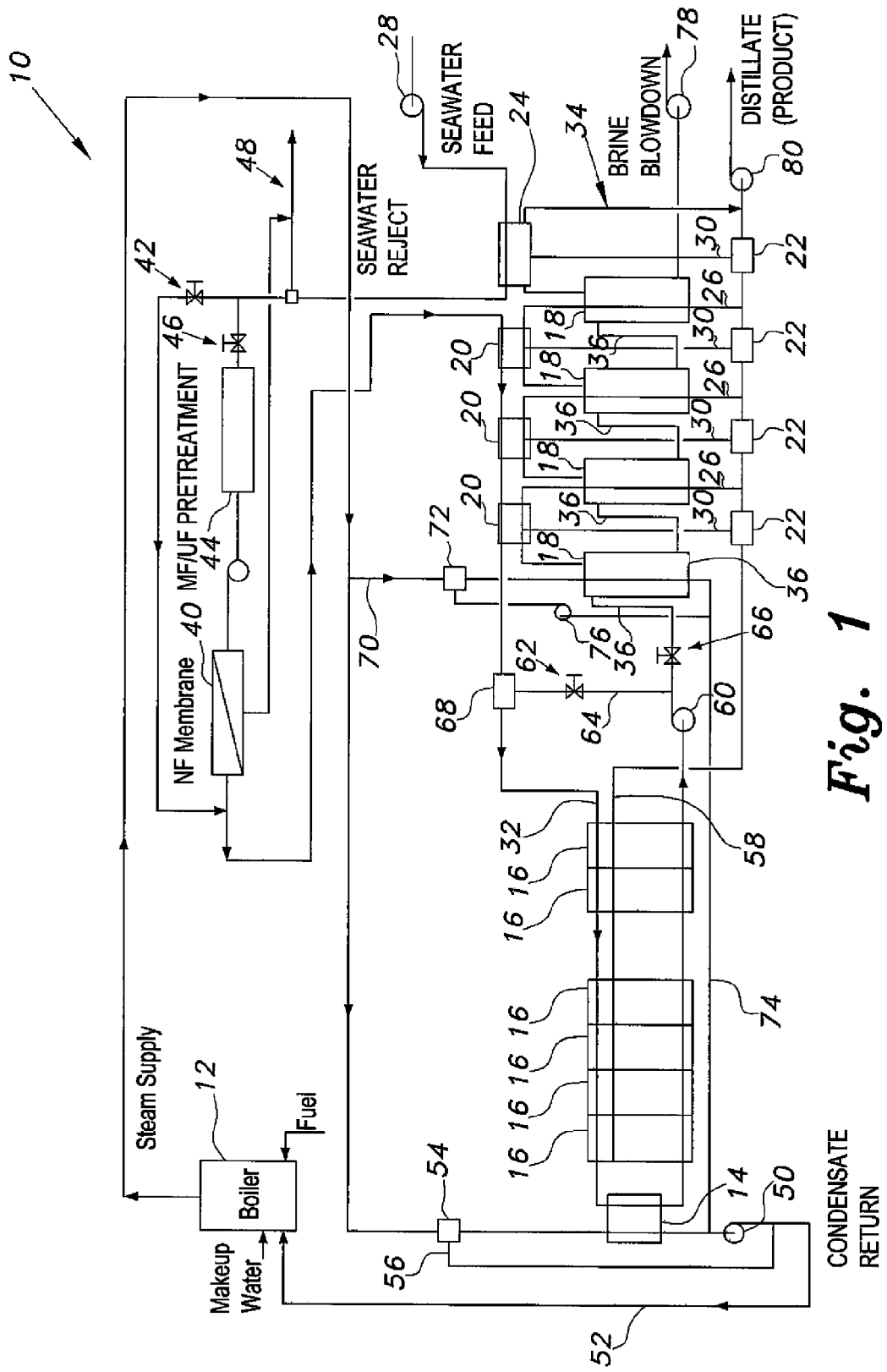
FIG. 1 diagrammatically shows a combination multi-effect distillation and multi-stage flash evaporation system according to the present invention.
Figure 2:
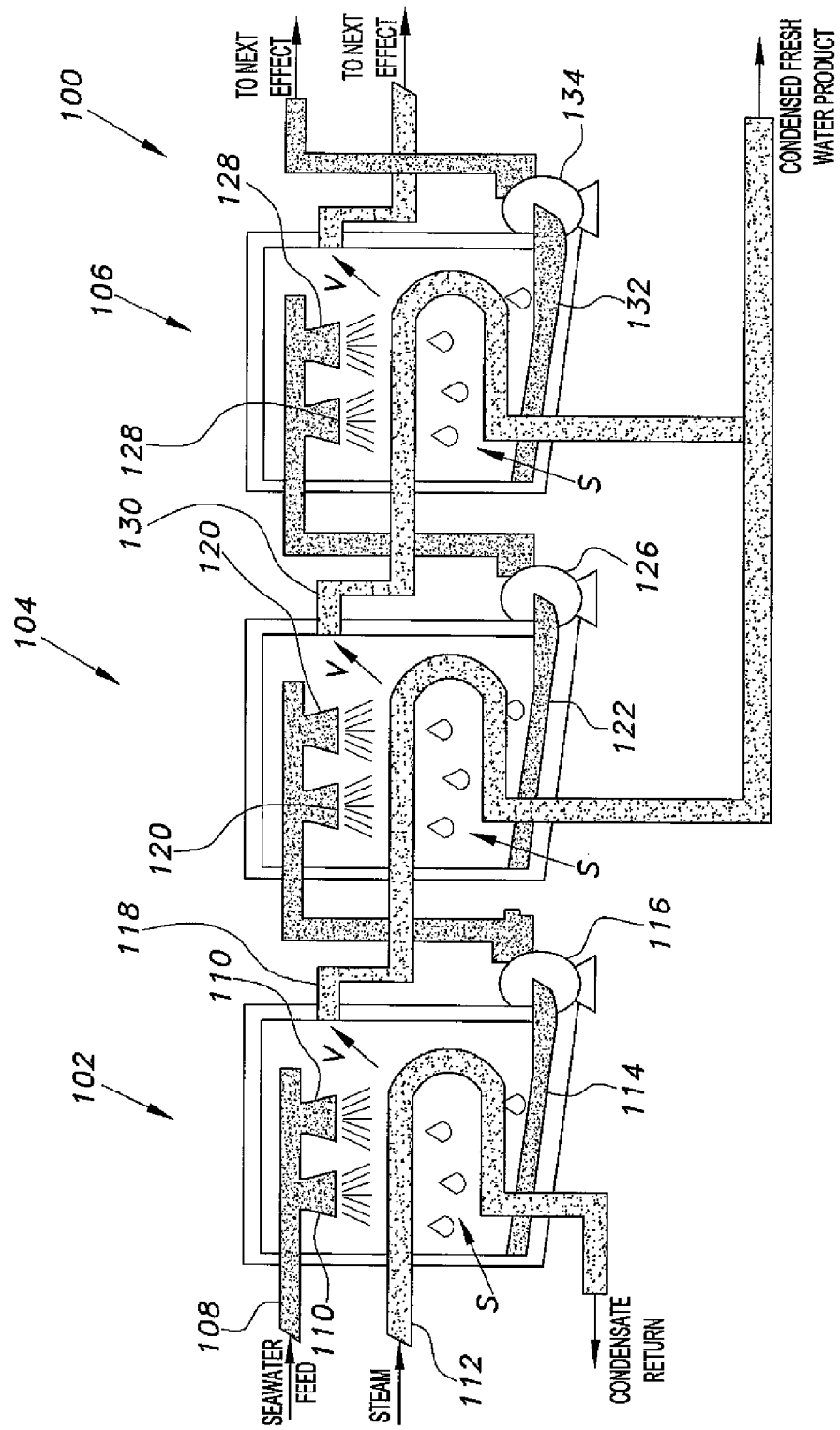
FIG. 2 diagrammatically shows a conventional prior art multi-effect distillation system.
Figure 3:
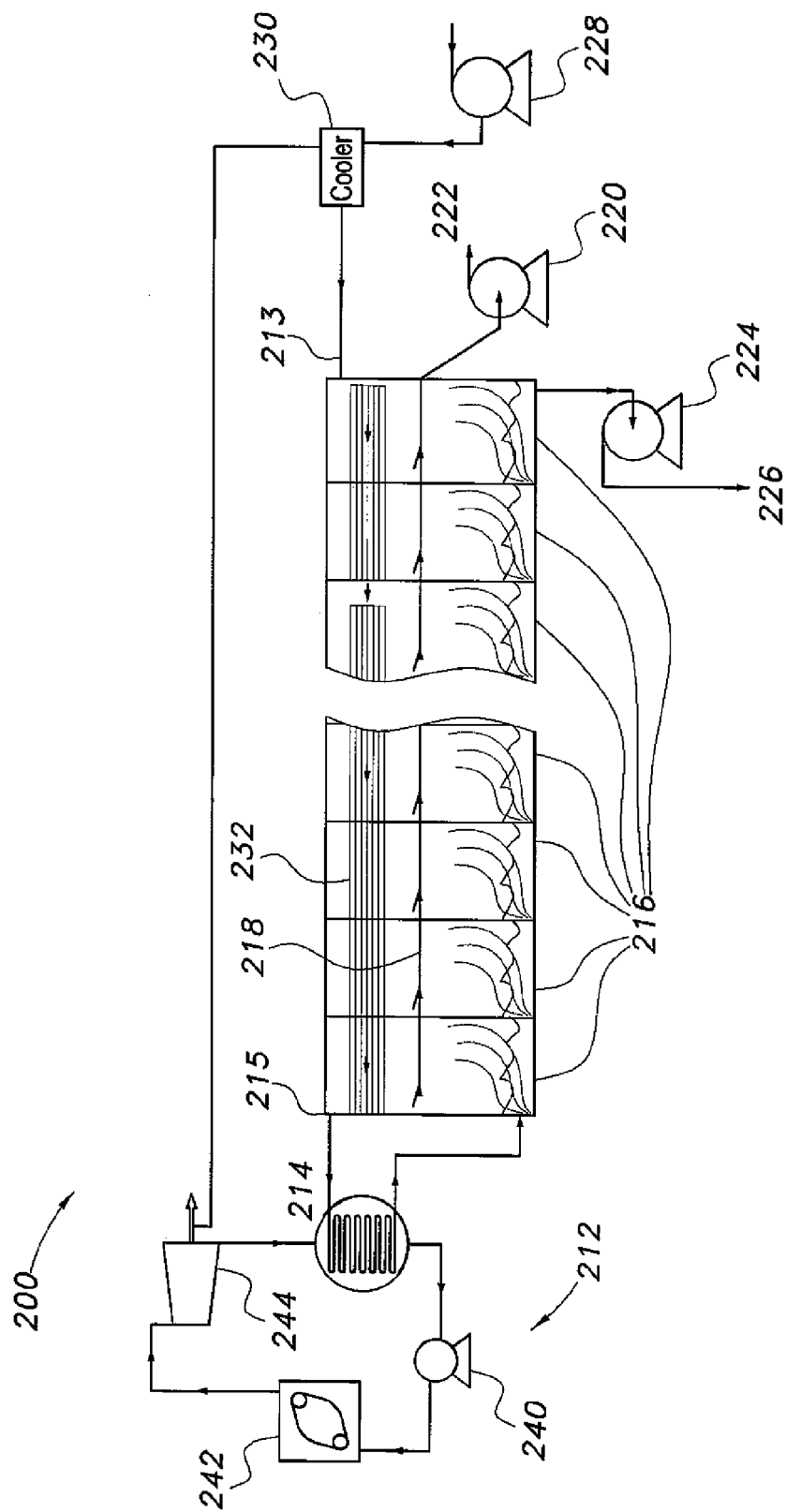
FIG. 3 diagrammatically shows a conventional prior art multi-stage flash evaporation system.
Figure 4:
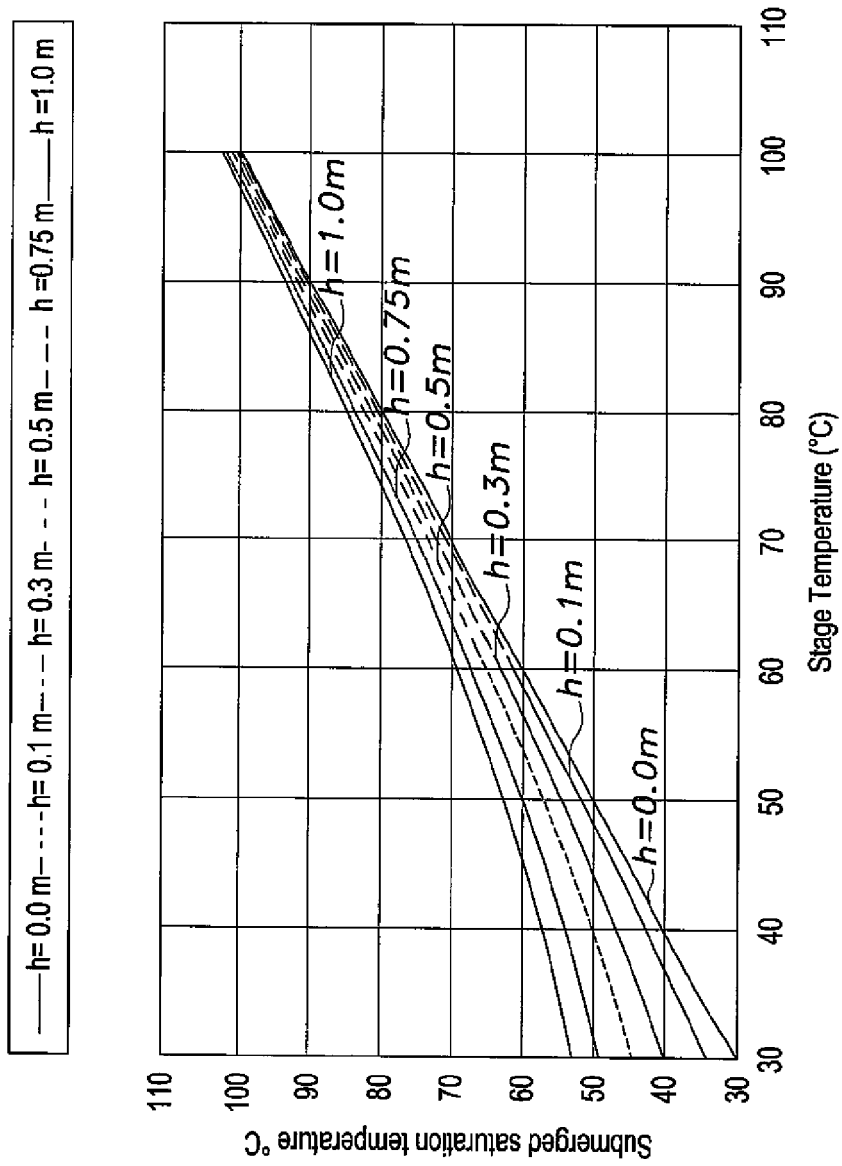
FIG. 4 is a graph showing plots for vapor equilibrium temperature in a brine pool at a given depth below the surface for varying depths, taken over typical flashing ranges for a conventional prior art multi-stage flash evaporation process.
Figure 5:
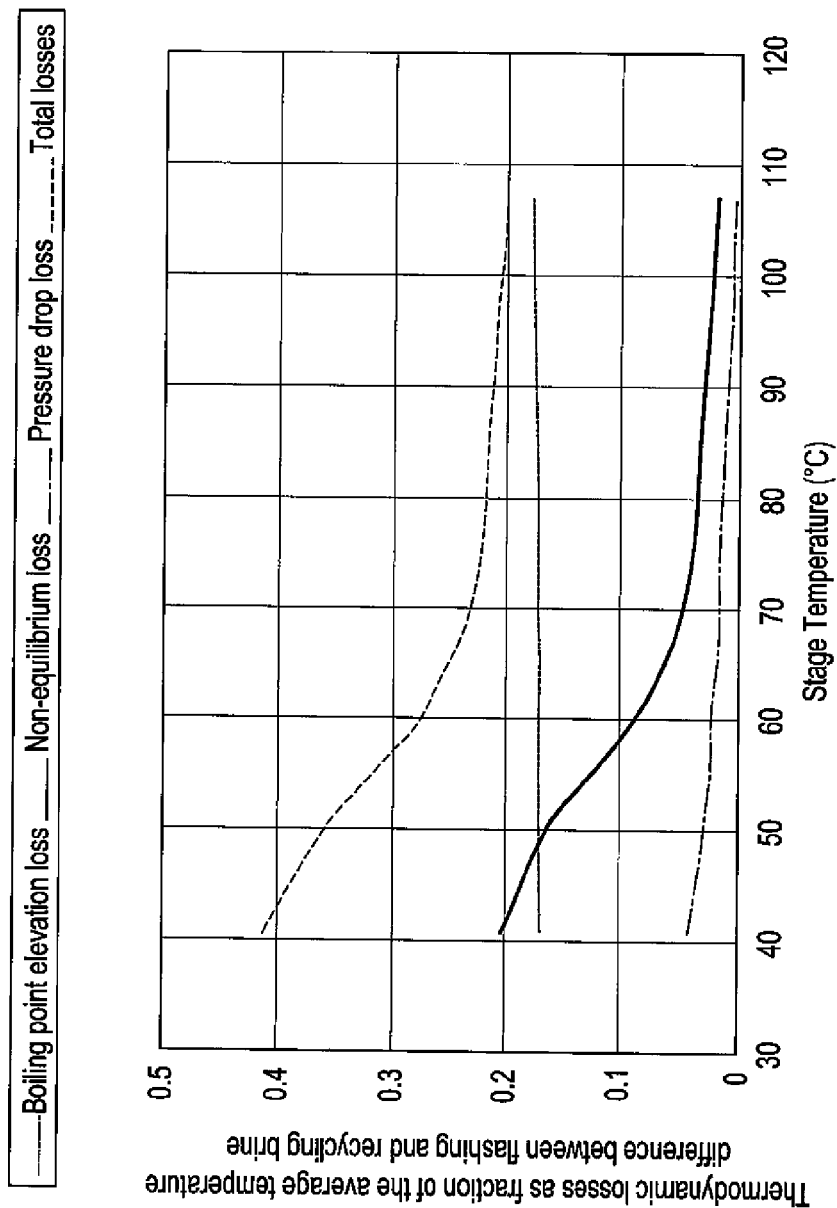
FIG. 5 is a graph showing plots of boiling point elevation loss, pressure drop loss and non-equilibrium loss, along with a resultant total thermodynamic loss, across the stages of a conventional prior art multi-stage flash evaporation system.
Figure 6:
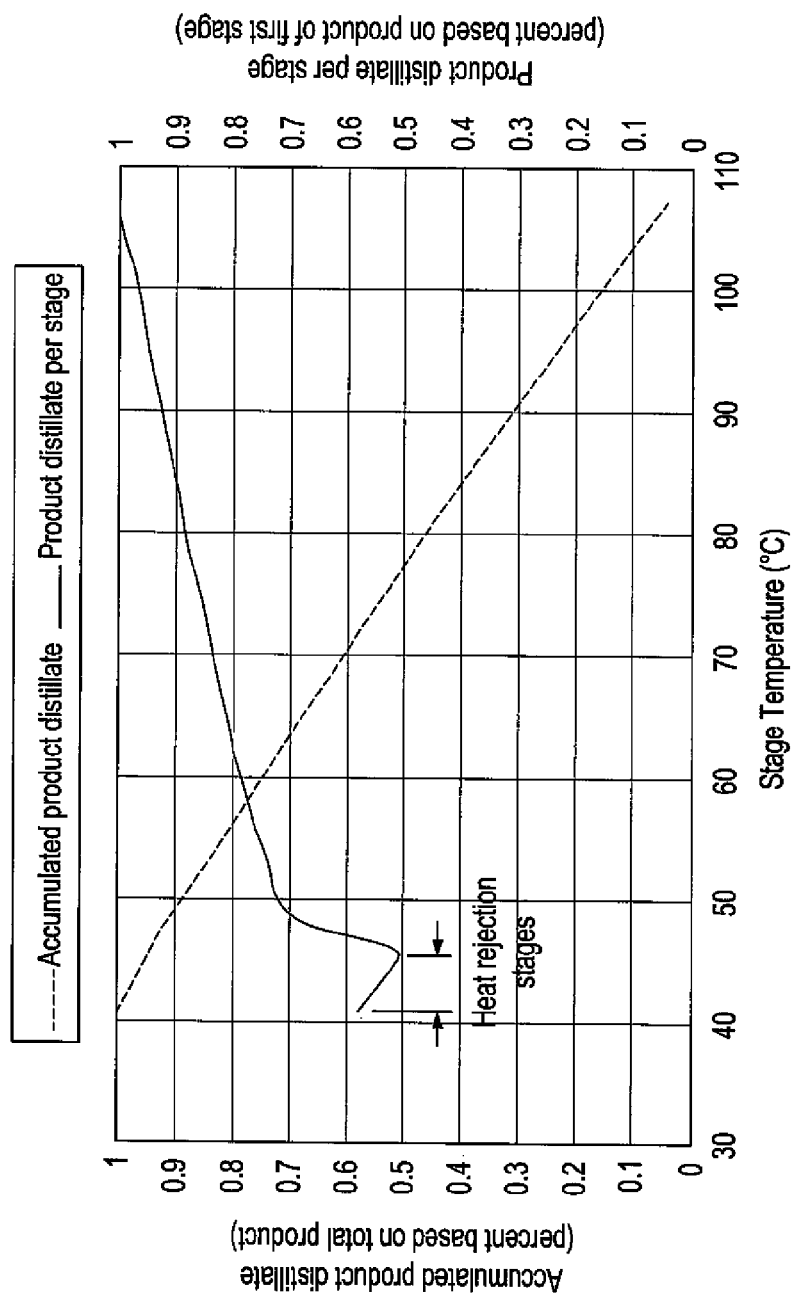
FIG. 6 is a graph showing the combined effect of the losses of FIG. 5, shown as per-stage and accumulated mass flow rates of product distillate, for a conventional prior art multi-stage flash evaporation system.

The combination multi-effect distillation and multi-stage flash evaporation system 10, as shown in FIG. 1, combines a multi-effect distillation (MED) system, similar to the MED system 100 of FIG. 2, with a multi-stage flash (MSF) evaporation system, similar to the MSF evaporation system 200 of FIG. 3. The multi-stage flash evaporation portion of system 10, shown in FIG. 1, begins with a mixture of seawater feed and recycled concentrated brine entering the system under pressure, being drawn into conduits or pipes 32 via a mixer 68 or the like. The seawater feed is drawn from an outside source by a pump 28 and passes through the final condenser 24 of the multi-effect distillation portion of system 10, as will be described in detail below. Prior to injection into the MSF process, the total volume (or, alternatively, only a first portion) of seawater feed is preferably pre-treated by passage through a filtering system 40 using a nanofiltration (NF) membrane or the like. Selective flow control of the first portion of seawater feed passing to the filtering system 40 may be provided by any suitable type of valve 46. A second portion of seawater feed bypasses the filtering system 40 through any suitable type of valve 42, as shown in FIG. 1. Filtering system 40 may be coupled selectively with a secondary, low-pressure microfiltration (MF) or ultrafiltration (UF) membrane filtration system 44. Untreated seawater or rejected brine from the filtering system 40 may be expelled from the system via outlet 48. The pre-treated seawater is then passed to the MSF portion of system 10 through the feed heaters 20 of the multi-effect distillation portion of system 10, as will be described in detail below. It should be understood that while seawater is discussed herein, other kinds of saltwater, e.g., brine, can be treated by the multi-effect distillation and multi-stage flash evaporation system.

The pre-treated, pre-heated seawater stream joins the first portion of the recycled concentrated brine stream from conduit or pipe 64, and the two streams are then mixed together in mixer 68 or the like. The mixture of seawater and brine is transported, under pressure, through conduits or pipes 32 to a brine heater 14, which then delivers heated brine to flash chambers 16. A boiler 12, which combusts fuel to heat recycled condensate along with additional makeup water, acts as the steam generator, supplying the brine heater 14 with the heating steam needed to heat up the brine. Following heat transfer to the brine, the steam condenses, and this condensate follows conduit or pipe 52 back into boiler 12 for recycling as steam. The condensate is pressurized by a pump 50. Additionally, a desuperheater 54 may be provided, as shown. The desuperheater 54 is used to inject controlled amounts of cooling water (i.e., condensate selectively provided by pump 50 through pipe or conduit 56) into the superheated steam flow to reduce or control steam temperature.

The flash chambers 16 act in a manner similar to those of the conventional MSF system 200 of FIG. 3, yielding desalinated distilled water, which is drawn out of the MSF portion by pipe or conduit 58. Recycle pump 60 passes first portion of the concentrated brine through recycle pipe or conduit 64 to mix at 68 with the pre-treated, pre-heated seawater, under control of a valve 62. The remainder of the concentrated brine enters the feed water inlet 36 of the MED portion of system 10, under control of valve 66.

The MED portion includes multiple effects 18, which operate in a manner similar to the conventional multi-effect distillation evaporator 100 of FIG. 2. As shown in FIG. 1, a portion of the steam generated by boiler 12 may be diverted along pipe or conduit 70, supplying heated steam to the steam chest of the first effect. A desuperheater 72, similar to desuperheater 54, may be provided in pipe or conduit 70, with a portion of the condensate being delivered thereto via pipe or conduit 74 and being pressurized by pump 76.

Heating vapor for each further effect of the MED portion is provided from vapor generated in the previous effect, after passing through the feed heaters 20, to heat up a portion of the brine entering from the feed water inlet 36 and converting it to vapor. The condensed vapor from each effect 18, which is desalinated water, is collected in the respective receptacle 22 via a pipe or conduit 26, with the first receptacle receiving the distillate from the MSF portion of system 10 via pipe or conduit 58. The vapor from the final effect passes through the final condenser 24. After condensing in the final condenser, the condensate is mixed with the distillate stream from last receptacle 22 via pipe or conduit 34, forming the final distillate product (i.e., desalinated water), which is removed by distillate pump 80. Reject brine is removed from final effect 18 by pump 78. Receptacles 22 are preferably provided with flashing pots, such that the distillate from the MSF portion, along with distillate from each subsequent effect of the MED portion, is fed to each flashing pot associated with a particular effect, where the pressure in the flashing pot is maintained at a specific vacuum, thus causing flashing of the distillate to occur at a desired rate. For example, pressure in the first one of the plurality of flash pots is equalized with the pressure in the first effect via pipe or conduit 30, and the first flash pot receives the distillate from the MSF portion of system 10 via pipe or conduit 58. Pressure in the second flash pot is equalized with pressure in the second effect via pipe or conduit 30, and the second flash pot receives distillate from the first effect via pipe or conduit 26, along with remaining unevaporated distillate from the first flash pot. This process continues until the pressure in the last flash pot is equalized with the pressure in the final condenser 24 via pipe or conduit 30. The last flash pot receives distillate from the last effect via pipe or conduit 26 along with the remaining unevaporated distillate from the previous flash pot.

System 10 shifts the flashing temperature range of the MSF process upward on the temperature scale while incorporating an MED subunit into the MSF system in the lower temperature range. Typical MSF plants operate under normal conditions with a flashing temperature range between about 40° C. and 90° C. In system 10, though, maintaining a similar 50° C. flashing span, the same MSF portion of system 10 can be operated for a flashing temperature range between 60° C. and 110° C., leaving the low temperature range between 40° C. and 60° C. for the added MED portion. Effectively, this is an expansion of the flashing temperature range similar to that in the high temperature operation of some MSF plants, but with a far better utilization of the flashing temperature range, especially the lower temperature range.

In FIG. 1, the MED portion operates on the lower temperature side of system 10. As described above, a portion of the concentrated brine from the MSF and the entire MSF product distillate continue to produce vapor by boiling and flashing through the MED portion, while the remaining portion of the concentrated brine is recycled back in the MSF portion after mixing with the makeup seawater feed. It should be noted that apart from the necessary changes in the process temperature and pressure gradients, the MSF process in system 10 remains relatively unchanged from a conventional MSF system, with the exception of the heat rejection section in the conventional system, which is no longer required in system 10. Instead, the heat rejection stages are added to the heat recovery section.

Figure 7:
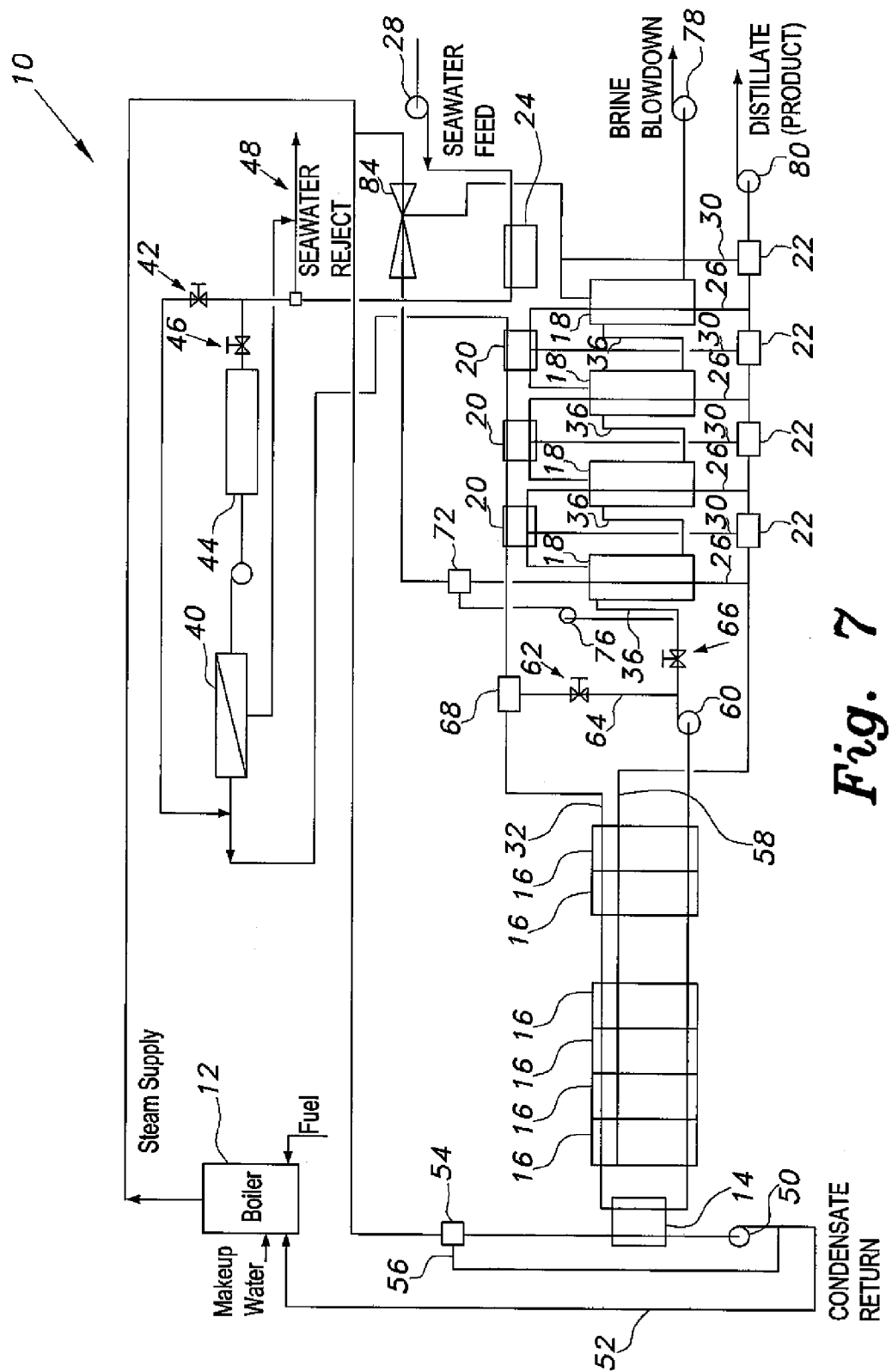
FIG. 7 diagrammatically shows an alternative embodiment of the combination multi-effect distillation and multi-stage flash evaporation system.
Figure 8:
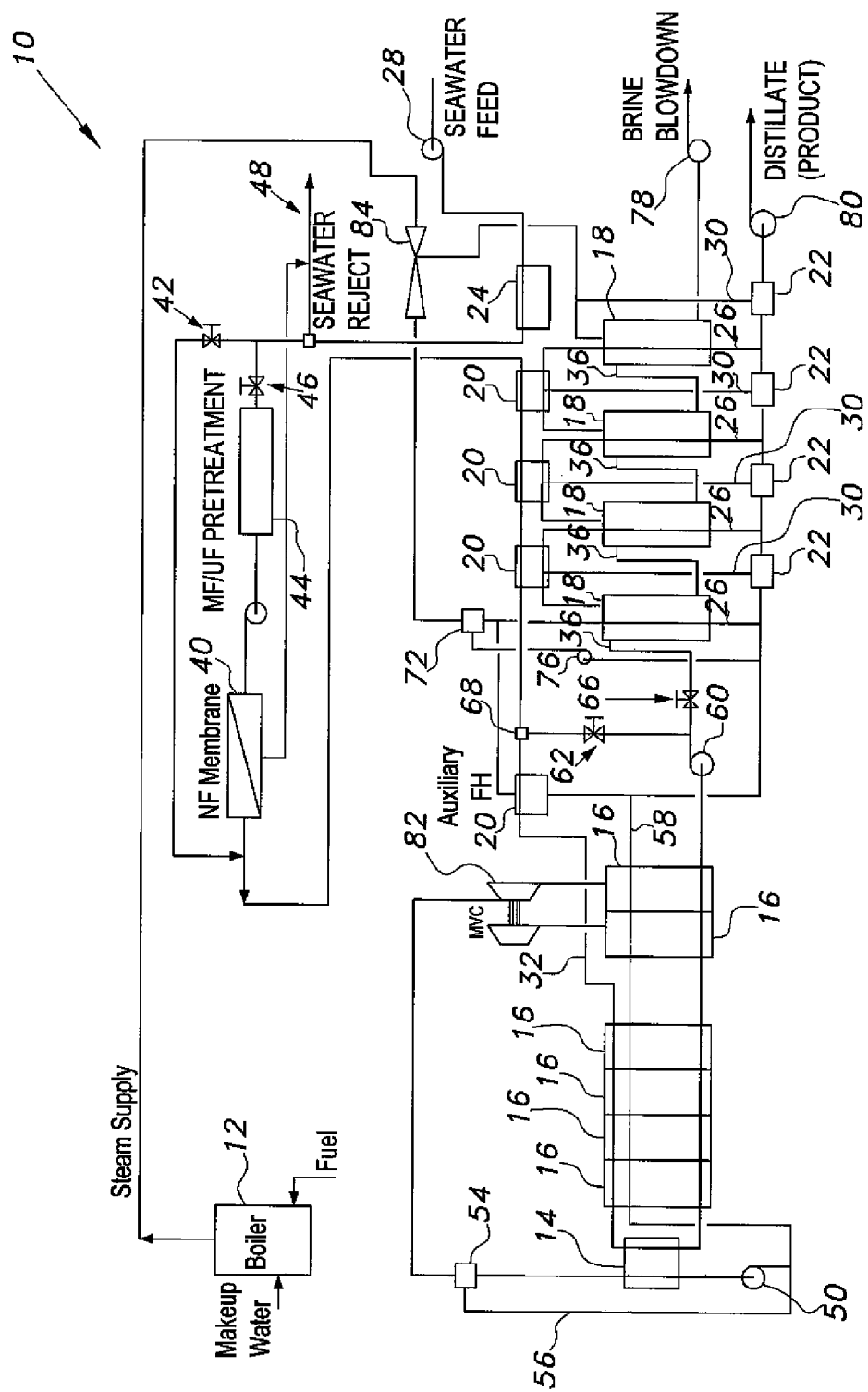
FIG. 8 diagrammatically shows a further alternative embodiment of the combination multi-effect distillation and multi-stage flash evaporation system.

In the alternative embodiment of FIG. 7, heat is recycled within the MED portion. In FIG. 7, vapor in the lowest temperature effect 18 and vapor flashed in the last receptacle 22 are recycled back by the thermal vapor compressor (TVC) 84 to be used as the heating steam driving the first effect. In the further alternative embodiment of FIG. 8, heat is recycled in both the MED and MSF portions. In FIG. 8, the system operates in a manner similar to that of the system of FIG. 7, however a further appropriate amount of vapor produced in the last few stages of the MSF is used to replace the heating steam supplied to the brine heater 14. In FIG. 8, this is shown being performed by a mechanical vapor compressor (MVC) 82, however it should be understood that any suitable type of compressor, including a TVC, may be used in this recycling process.

In the embodiments of FIGS. 7 and 8, the MSF portion is of recycle type, but the heat rejection stages are joined with the heat recovery stages. The MED portion still operates in a conventional manner, where feed water is heated in the MED feed heaters 20 and then mixed with recycled brine for further heating in the MSF stages 16 until it reaches the brine heater 14. The portion of the concentrated brine withdrawn from the MSF portion is fed to the first MED effect for further boiling, flashing, and evaporation.

The distillate from the MSF portion is fed to first flashing pots 22, where the pressure therein is maintained at the vacuum of the first effect, thus causing flashing of the distillate to occur at the desired rate. The vapor released by flashing of the distillate is passed on to join the vapor heating the feed in the respective feed heater 20. The brine reject from each effect 18, operating on the higher temperature side of the system, is passed on to the subsequent effect to allow further boiling and flashing and generation of vapors. Similarly, the product distillate of each effect 18 is passed on to the next lower temperature flash pot 22 to allow recovery of its excess heat by partial flashing. The vapor released in the last effect 18 can either be passed on to the final condenser 24, where it condenses at the lowest process temperature, and, thus, the lowest pressure, or alternatively be compressed by a thermal vapor compressor (TVC) 84 or the like for reuse, as in the alternative embodiments of FIGS. 7 and 8.

In order to show the effectiveness of the combination multi-effect distillation and multi-stage flash evaporation system 10, Tables 1A and 1B below show sample performance characteristics of conventional MED and MSF systems compared against the combination MED-MSF desalination system operating as a heat-driven system (i.e., the embodiment of FIG. 1); a TVC-driven MED portion and heat-driven MSF portion of the combination MED-MSF desalination system (i.e., the embodiment of FIG. 7); and a TVC-driven MED portion and a MVC-driven MSF portion of the combination MED-MSF desalination system (i.e., the embodiment of FIG. 8). Process performance indicators include equivalent gain output ratio (GOR) in unit mass of distillate per unit mass of equivalent amount of heating steam (e.g., kg distillate/kg equivalent heating steam), total energy input (thermal and electrical) in kWh per ton of distillate, total energy input (including the sum of all actual useful energy based on the Second Law of thermodynamics) in kWh per ton of distillate, and product water recovery ratios (distillate mass/seawater makeup feed, or distillate mass/total seawater feed including cooling). As can be seen in Tables 1A and 1B, the GOR is significantly higher for the combination MED-MSF desalination system embodiments compared against the conventional MED process and the conventional MSF process. Further, the energy input and energy input are significantly lower for the combination MED-MSF desalination system compared against the conventional MED process and the conventional MSF process. The most significant of these indicators is the energy input, which shows that the heat-driven MED-MSF combination is the most efficient of all three embodiments. Furthermore, in terms of product water recovery ratio, the MED-MSF combination is clearly superior compared to the conventional MED process and the conventional MSF process. The product water recovery ratio for the heat-driven MED-MSF combination system is the highest in all three embodiments of the MED-MSF combination system. With such superior performances and higher product water recovery ratios, the combination MED-MSF desalination system clearly outperforms the other systems and techniques in terms of operating and overall product water unit costs.

TABLE 1A

Comparison of the Combination MED-MSF Desalination System Against Conventional MSF

| System Description | Number of Stages or Effects MSF | Number of Stages or Effects MED | TBT °C./ Last Stage or Effect Temp °C. MSF | TBT °C./ Last Stage or Effect Temp °C. MED | Heating Steam °C. MSF | Heating Steam °C. MED | TVC Motive Steam °C. MED |
|---|---|---|---|---|---|---|---|
| Conventional MED System (FIG. 2) | N/A | 9 | N/A | 75/40 | N/A | 80 | N/A |
| Conventional MSF System (FIG. 3) | 19 | N/A | 90.6/40.6 | N/A | 100 | N/A | N/A |
| Conventional MSF System (FIG. 3) | 23 | N/A | 110/40.6 | N/A | 120 | N/A | N/A |
| Combination MED-MSF System (FIG. 1) | 19 | 9 | 110/76.3 | 76.3/40 | 120 | 82.2 | N/A |
| Combination MED-MSF System (FIG. 7) | 19 | 9 | 110/76.4 | 76.4/40.5 | 120 | N/A | 141.68 |
| Combination MED-MSF System (FIG. 8) | 19 | 9 | 110/82.2 | 82.2/46 | N/A | N/A | 141.68 |

TABLE 1B

Comparison of the Combination MED-MSF Desalination System Against Conventional MSF

| System Description | Equivalent GOR (Kg distillate/ kg steam) | Performance Ratio (kWh/ton distillate) | Exergy Input (Thermal + Pumps, kWh/ton distillate) | Product Water Recovery Ratio (ton distillate/ton seawater) |
|---|---|---|---|---|
| Conventional MED System (FIG. 2) | 7.71 | 82.87 | 11.56 | 0.398/0.0675 |
| Conventional MSF System (FIG. 3) | 7.14 | 316.97 | 61.37 | 0.3745/0.0914 |
| Conventional MSF System (FIG. 3) | 8.9 | 248.22 | 58.61 | 0.3745/0.1149 |
| Combination MED-MSF System (FIG. 1) | 10.57 | 57.79 | 3.69 | 0.495/0.107 |
| Combination MED-MSF System (FIG. 7) | 9.48 | 52.8 | 8.0 | 0.388/(N/A) |
| Combination MED-MSF System (FIG. 8) | 15.4 | 58.6 | 14.73 | 0.4762/(N/A) |

It is to be understood that the present invention is not limited to the embodiments described above, but encompasses any and all embodiments within the scope of the following claims.

I claim:

1. A combination multi-effect distillation and multi-stage flash evaporation system, comprising:

a multi-stage flash evaporation system comprising a brine heater and a plurality of flashing and condensation stages, the multi-stage flash evaporation system receiving a volume of saltwater from an external source and producing distilled water by sequential flashing effect and passing brine and the distilled water from one stage to the next, and finally forwarding the brine from the last flashing stage to a multi-effect distillation system for further evaporation; and the multi-effect distillation system comprising a plurality of condensation and evaporation effects and a final condenser, the last stage of the multi-effect distillation system receiving the brine from the multi-stage flash evaporation system for further evaporation by film boiling thereof and producing a desalinated water distillate; and wherein the saltwater feeding the multi-stage flash evaporation system at ambient temperature is heated to a maximum permissible temperature without formation and precipitation of sulfate scale (salts) and concurrently the brine and the desalinated water distillate are cooled by sequential efficient flashing effect with minimum temperature-dependent non-equilibrium losses and exiting the last flashing stage at a temperature approximately at midpoint between ambient and the maximum permissible temperature; and wherein the brine enters the first effect of the multi-effect distillation system and continues to evaporate sequentially by efficient film boiling with no non-equilibrium losses; and wherein vapor from the last effect condenses in the final condenser, which is the main heat sink in the combination system, and the brine exiting the last effect of the multi-effect distillation system at temperature very near ambient temperature; and wherein the desalinated water distillate accumulated in the last flashing stage of the multi-stage flash evaporation system is forwarded to the first effect of the multi-effect distillation system at a temperature approximately at midpoint between ambient and the maximum permissible temperature, and the sensible heat of the distilled water by successive flashing in the multi-effect distillation system and exiting the last effect at a temperature very near ambient temperature.

2. The combination multi-effect distillation and multi-stage flash evaporation system as recited in claim 1, wherein each of the flashing and condensation stages comprises a flash chamber and a condenser, the condenser having at least one conduit having an inlet and an outlet, the at least one conduit passing through the plurality of flash chambers.

3. The combination multi-effect distillation and multi-stage flash evaporation system as recited in claim 2, further comprising means for extracting the volume of saltwater from the external source, passing it through the final condenser and feeding the volume of saltwater under pressure through the at least one conduit, the means being in fluid communication with the inlet of the at least one conduit.

4. The combination multi-effect distillation and multi-stage flash evaporation system as recited in claim 3, wherein the brine heater further comprising means for heating the volume of saltwater after the volume of saltwater has been delivered through the at least one conduit and prior to injection thereof into the flashing and condensation stage.

5. The combination multi-effect distillation and multi-stage flash evaporation system as recited in claim 4, further comprising means for extracting the desalinated water distillate from a last stage of the multi-stage flash evaporation system, wherein the heated volume of saltwater injected into the plurality of flash chambers is flashed into vapor within the plurality of flash chambers, and the vapor condenses on an external surface of the at least one conduit to form the desalinated water distillate.

6. The combination multi-effect distillation and multi-stage flash evaporation system as recited in claim 5, wherein the means for extracting the volume of saltwater from an external source and feeding the volume of saltwater under pressure through the at least one conduit comprises at least one pump in fluid communication with the inlet of the at least one conduit.

7. The combination multi-effect distillation and multi-stage flash evaporation system as recited in claim 6, wherein the brine heater for heating the volume of saltwater further comprises:
a boiler for delivering first heating steam into the brine heater after the volume of saltwater has been pre-heated by the at least one conduit;
wherein the a brine heater in fluid communication with the outlet of the at least one conduit.

8. The combination multi-effect distillation and multi-stage flash evaporation system as recited in claim 7, further comprising a first desuperheater in communication with the heater for selectively cooling the first heating steam prior to delivery thereof into the brine heater, wherein a first portion of condensed steam produced by the heater is recycled for use in the first desuperheater and a second portion of the condensed steam produced by the heater is recycled for use in the boiler.

9. The combination multi-effect distillation and multi-stage flash evaporation system as recited in claim 8, further comprising a second desuperheater for selectively cooling a second heating steam produced by the boiler prior to delivery thereof into a first one of the plurality of condensation and evaporation effects of the multi-effect distillation system.

10. The combination multi-effect distillation and multi-stage flash evaporation system as recited in claim 9, further comprising:
a plurality of feed heaters, wherein each the feed heater is in communication with the at least one conduit and a respective one of the effects; and
a plurality of flash pots, each flash pot being in communication with a respective effect and configured for pressure equalization.

11. The combination multi-effect distillation and multi-stage flash evaporation system as recited in claim 5, further comprising a nanofiltration membrane pre-treatment system for removal of hardness ions from the saltwater, in order to bring the concentration of sulfate ions to a level consistent with the maximum permissible temperature prior to delivery thereof to the multi-stage flash evaporation system.

12. The combination multi-effect distillation and multi-stage flash evaporation system as recited in claim 11, wherein the pre-treatment system comprises a nanofiltration system selected from the group consisting of a low pressure microfiltration system, an ultrafiltration membrane filtration system, and a combination thereof.

13. The combination multi-effect distillation and multi-stage flash evaporation system as recited in claim 11, wherein the pretreatment system further comprises one or more valves to regulate the flow rate of the saltwater stream passing through the nanofiltration membrane pre-treatment system and the remainder of the saltwater stream that is bypassing the nanofiltration membrane pre-treatment system;
wherein the nanofiltration pretreated stream and untreated bypassing stream are mixed again to meet the maximum permissible concentration of sulfate ions consistent with the said maximum temperature.

14. The combination multi-effect distillation and multi-stage flash evaporation system as recited in claim 5, further comprising a pump in fluid communication with the at least one conduit and the inlet to the first one of the plurality of condensation and evaporation effects of the multi-effect distillation system, the pump being configured for extracting the brine in the flash chamber of the last stage in the multi-stage flash evaporation and delivering it under pressure in two portions, wherein a first portion mixing with incoming saltwater to maintain flow rate required for circulating in the multi-stage flash evaporation system for continuous desalination, and a second portion thereof passes to the first effect of the multi-effect distillation system for further desalination.

15. The combination multi-effect distillation and multi-stage flash evaporation system as recited in claim 5, further comprising a thermal vapor compressor in fluid communication with a final one of the plurality of condensation and evaporation effects of the multi-effect distillation system for recycling latent heat of the vapor in the said final effect to reheat the brine delivered from the last flash stage of the multi-stage flash evaporation system to the first effect of the multi-effect distillation system.

16. The combination multi-effect distillation and multi-stage flash evaporation system as recited in claim 5, wherein the brine heater for heating the volume of brine comprises:

a mechanical vapor compressor in fluid communication with the final one of the plurality of flash evaporation stages for delivering vapor generated in the last flash evaporation stage into the brine heater as first heating steam, thus recycling the latent heat of the vapor for heating the volume of brine after the volume of brine has been heated by the at least one conduit;

wherein the a brine heater in fluid communication with the outlet of the at least one conduit.

17. The combination multi-effect distillation and multi-stage flash evaporation system as recited in claim 16, further comprising a desuperheater for selectively cooling the heating steam prior to delivery thereof into the brine heater.

18. The combination multi-effect distillation and multi-stage flash evaporation system as recited in claim 17, wherein the desuperheater is in communication with the brine heater and at least a portion of condensed steam produced by the brine heater is recycled for use in the desuperheater.

19. The combination multi-effect distillation and multi-stage flash evaporation system as recited in claim 18, further comprising a pre-treatment system for filtering the volume of saltwater prior to delivery thereof to the multi-stage flash evaporation system.

* * * * *